July 17, 1934.  E. M. ROSENFIELD  1,967,193
SWITCH OR JUNCTION BOX
Filed May 4, 1931
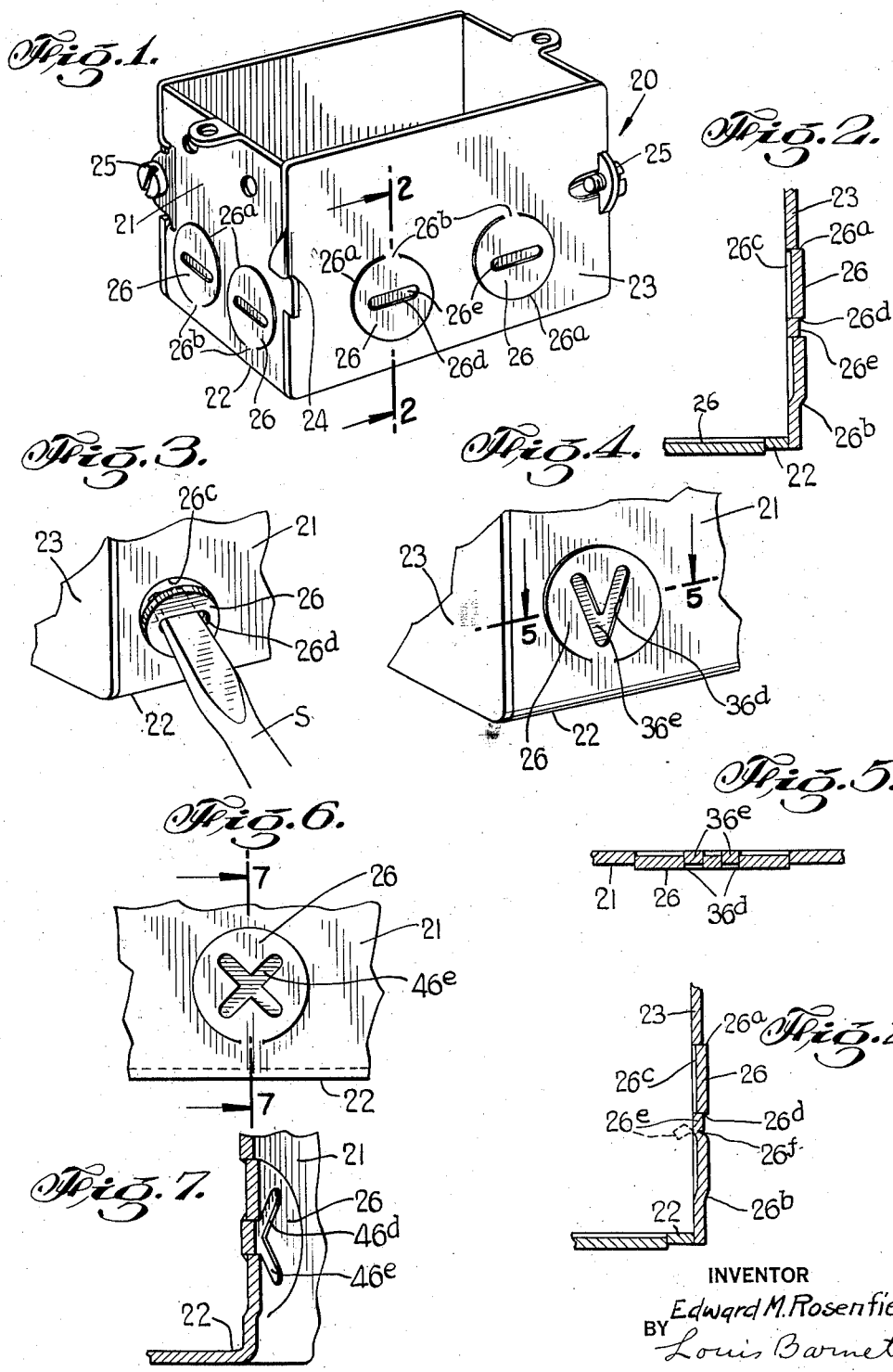
INVENTOR
Edward M. Rosenfield
BY Louis Barnett
ATTORNEY Patented July 17, 1934

1,967,193

UNITED STATES PATENT OFFICE 1,967,193

SWITCH OR JUNCTION BOX

Edward M. Rosenfield, New York, N. Y., assignor to Standard Electric Equipment Corporation, a corporation of Delaware Application May 4, 1931, Serial No. 534,743

5 Claims. (Cl. 247—26)

This invention relates to sheet metal electric switch or junction boxes, such as used in electric wiring installations and more particularly is directed to improved means for removing "knock-outs" provided in said boxes.

Among the objects of the invention is to generally improve the construction of "knock-outs" of electric boxes by providing dislodging means whereby said "knock-outs" may be readily removed from their seated position from the exterior side of the box thereby eliminating all interference with the cable clamping or wiring within the boxes, said "knock-outs" construction being formed of few and simple parts which shall be cheap to fabricate, and practical and efficient to a high degree in use.

Other objects of this invention will in part be obvious and in part hereinafter pointed out.

The invention accordingly consists in the features of construction, combinations of elements and arrangement of parts which will be exemplified in the constructions hereinafter described and of which the scope of application will be indicated in the following claims.

In the accompanying drawing, in which is shown various possible illustrative embodiments of this invention.

Fig. 1 is a perspective view of an electric junction or switch box having "knock-outs" embodying the invention.

Fig. 2 is a cross-sectional view taken on lines 2—2 in Fig. 1.

Fig. 2a is a fragmentary cross-sectional view similar to Fig. 2 showing the slot material or punching retained by a partially severed peripheral portion.

Fig. 3 is a fragmentary perspective view showing the method of dislodging a "knock-out" by prying out.

Fig. 4 is a fragmentary perspective view of a switch box having a "knock-out" provided with a V-form of prying means embodying the invention.

Fig. 5 is a cross-sectional view taken on lines 5—5 in Fig. 4.

Fig. 6 is a fragmentary view of a switch box having a "knock-out" provided with an X-form of prying means embodying the invention, and Fig. 7 is a perspective sectional view taken on lines 7—7 in Fig. 6.

Referring in detail to the drawing, 20 denotes an electric switch or junction box of the conventional construction formed of steel stamped parts having end walls 21 usually formed integral with the bottom side of the box 22, and detachable side walls 23, the latter being retained in position through the interlocking connection 24 and the screw fastening 25 in the well understood manner and as shown in Fig. 1.

The box 20 has "knock-outs" 26 which are provided in the end walls 21, the bottom side 22 of the box, and in the side walls 23. These "knock-outs" 26 may be of any desired shape, preferably being circular and of a diameter to correspond to the diameter of standard sizes of conduits or cables (not shown). Said "knock-outs" 26 may be formed in the well understood manner by a punch and die the metal being severed along single continuous lines 26a leaving unsevered portions 26b for retaining the "knock-outs" in position as removable closures for the openings 26c in the walls 21, 22 and 23.

Since these "knock-outs" 26 are in many cases positioned in close proximity to electric cable clamping means inside the box 20 (not shown), it is often convenient to be able to remove the "knock-outs" from the exterior side of the box without the necessity of reaching into the box to dislodge same from their effective closing position. To this end, the invention herein described and claimed is directed in providing on each "knock-out" 26 suitable means for engaging with a suitable prying tool such as a screw driver S or hammer. In the form shown in Figs. 1, 2 and 3, this pry-engaging means comprises a centrally located punched slot 26d which extends transversely through the mid-portion of the "knock-outs" 26. Said slot may preferably be positioned wholly within the body of the "knock-out" inwardly from the severed line 26b. Materials or punchings 26e of the "knock-outs" 26 within the slots 22d may be left in position to form closures for said slots, as shown in Figs. 1 and 2 so as to eliminate through perforations in the walls and bottom side of the box, since such perforations are considered objectionable because they provide communication between the interior and exterior of the box which may form a possible fire hazard in case of a defect in the wiring installation or arcing of switch parts within the box.

One of the preferred constructions of "knock-out" 26 and slot material 26e with relation to the box wall is clearly shown in Fig. 2, the "knock-out" being pressed in an outwardly direction a small distance, and the slot material 26e being pressed in an inwardly direction a small distance with respect to the "knock-out" 26.

The utility of the invention is now apparent.

In forming the "knock-outs" 26, the slots 26d are formed as shown in Fig. 2. In order to remove the "knock-outs" 26, a blade of screw driver S or similar tool is used. A slight blow given on the exterior side of the slot material 26e with screw driver blade dislodges the slot material 26e permitting the blade to enter the slot 20d. By swinging the screw driver S the "knock-out" 26 is pried outwardly from the opening 26c as is clearly shown in Fig. 3. When the "knock-outs" 26 are forced out sufficiently from the plane of the wall 21, the unsevered portion 26b which connects and retains the "knock-outs" to the wall breaks off leaving the opening 26c free for receiving an end of an electric cable, conduit, or the like in the well understood manner.

Instead of entirely severing the slot material 26e from the "knock-out" 26, one or more portions may be only partially cut through as at 26f as shown in Fig. 2a which will allow the slot material 26e to be dislodged from the opening 26c, yet remain attached to the "knock-out".

In Figs. 4 and 5, a modified form of the invention is shown. Here the pry-engaging means comprises of a V-shaped slot 36d in which the slot material 36e is removed by abutting a blade of the screw driver S on one of the legs of the V and giving the screw driver a slight blow so as to dislodge said slot material thus leaving the whole or one leg of V-shaped slot free for entering the blade to permit the outwardly prying operation. By providing a V-shaped slot 36d in place of a straight slot 26d, shown in Figs. 1 to 3, the prying movement with the screw drivers can be selectively accomplished in either one of two directions, the prying being carried out in a direction which is most convenient. Sometimes the box 20 is so installed that no space is available to swing the screw driver in one direction for prying. In such cases, the screw driver can be entered into the leg of the V for prying in the other direction thus giving the workman greater latitude for prying movement.

In Figs. 6 and 7, is shown still another form of pry-engaging means. Here an X-shaped slot 46d having slot material 46e is provided whereby the prying operation with the screw driver S may be accomplished in two directions at 90 degrees with respect to each other.

It is to be understood that while only a V and X form of slot is here disclosed for the purpose of providing means for prying in a plurality of directions, other shapes may be used as for example, L, T, triangle, star, etc.

The slot materials 36e and 46e shown in Figs. 4 and 6, may be formed with one or more portions only partially cut through as explained for the "knock-out" shown in Fig. 2a to retain them to the "knock-out", yet permit said slot materials 36e and 46e to be dislodged from their corresponding openings. If desired, the slot materials 36e and 46e may be severed to sectionalize them so that only sufficient material is dislodged to permit the insertion of the blade of the prying tool as is apparent.

It will thus be seen that there is provided means whereby the several objects of this invention are achieved and which are well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. An electric switch box formed of sheet metal having a severed disc-shaped pry-out adapted to be removed for providing an opening, said pry-out having a pair of intersecting narrow slots in a mid-portion thereof for selectively entering means to pry the pry-out free from said opening, the edges of each of said slots being constructed and arranged to serve as a bearing along substantially the entire length engaging said prying means.

2. An electric wall box having a severed wall portion retained in position to provide a "knock-out", said portion having a pair of intersecting elongated slots adapted to receive a tool for dislodging said "knock-out" from its retaining position by prying movement exerted in either one of two planes, each prying movement corresponding selectively to one of said slots.

3. In an electric protective means a casing having a pry-out in a wall thereof, said pry-out being provided with a pair of elongated intersecting slots extending through the thickness thereof for the reception of a prying tool whereby prying movement corresponding selectively to one of said slots, said slots lying within the boundary of said pry-out.

4. In an electric protective means, a casing having a pry-out in a wall thereof, said pry-out being provided with a V-shaped opening extending through the thickness thereof for the reception of a prying tool whereby prying movement in one of a plurality of planes may be exerted to pry loose said pry-out from said wall, said opening lying within the boundary of said pry-out.

5. In an electric protective means, a casing having a pry-out in a wall thereof, said pry-out being provided with an X-shaped opening for the reception of a prying tool in various angular positions whereby said pry-out may be pried loose from said wall, said opening lying within the boundary of said pry-out.

EDWARD M. ROSENFIELD.